(12) United States Patent
Ota et al.

(10) Patent No.: US 8,218,290 B2
(45) Date of Patent: Jul. 10, 2012

(54) SOLID ELECTROLYTIC CAPACITOR

(75) Inventors: Taeko Ota, Takatsuki (JP); Masayuki Fujita, Kyoto (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 848 days.

(21) Appl. No.: 12/194,607

(22) Filed: Aug. 20, 2008

(65) Prior Publication Data

US 2009/0052119 A1 Feb. 26, 2009

(30) Foreign Application Priority Data

Aug. 22, 2007 (JP) ................. 2007-216059

(51) Int. Cl.
*H01G 9/00* (2006.01)
*H01G 9/02* (2006.01)
(52) U.S. Cl. ....................... 361/523; 361/525
(58) Field of Classification Search ............... 361/523, 361/525
See application file for complete search history.

(56) References Cited

U.S. PATENT DOCUMENTS

| 7,342,772 | B2* | 3/2008 | Tadanobu et al. | 361/523 |
| 7,826,200 | B2* | 11/2010 | Pascenko | 361/523 |
| 2006/0267183 | A1* | 11/2006 | Sawle | 257/707 |

FOREIGN PATENT DOCUMENTS

| JP | 07-094368 A | 4/1995 |
| JP | 2002-015956 A | 1/2002 |

* cited by examiner

*Primary Examiner* — Eric Thomas
*Assistant Examiner* — Arun Ramaswamy
(74) *Attorney, Agent, or Firm* — Marvin A. Motsenbocker; Mots Law, PLLC

(57) ABSTRACT

Provided is a solid electrolytic capacitor with low ESR (equivalent series resistance) and excellent reliability during high-temperature storage. The solid electrolytic capacitor includes an anode formed of a valve metal, a dielectric film provided on the anode, a conducting polymer layer provided on the dielectric layer, and a cathode extraction layer provided on the conducting polymer layer. The conducting polymer layer contains a metal-based conductive filler in at least one of a flake form and a fiber form.

20 Claims, 2 Drawing Sheets

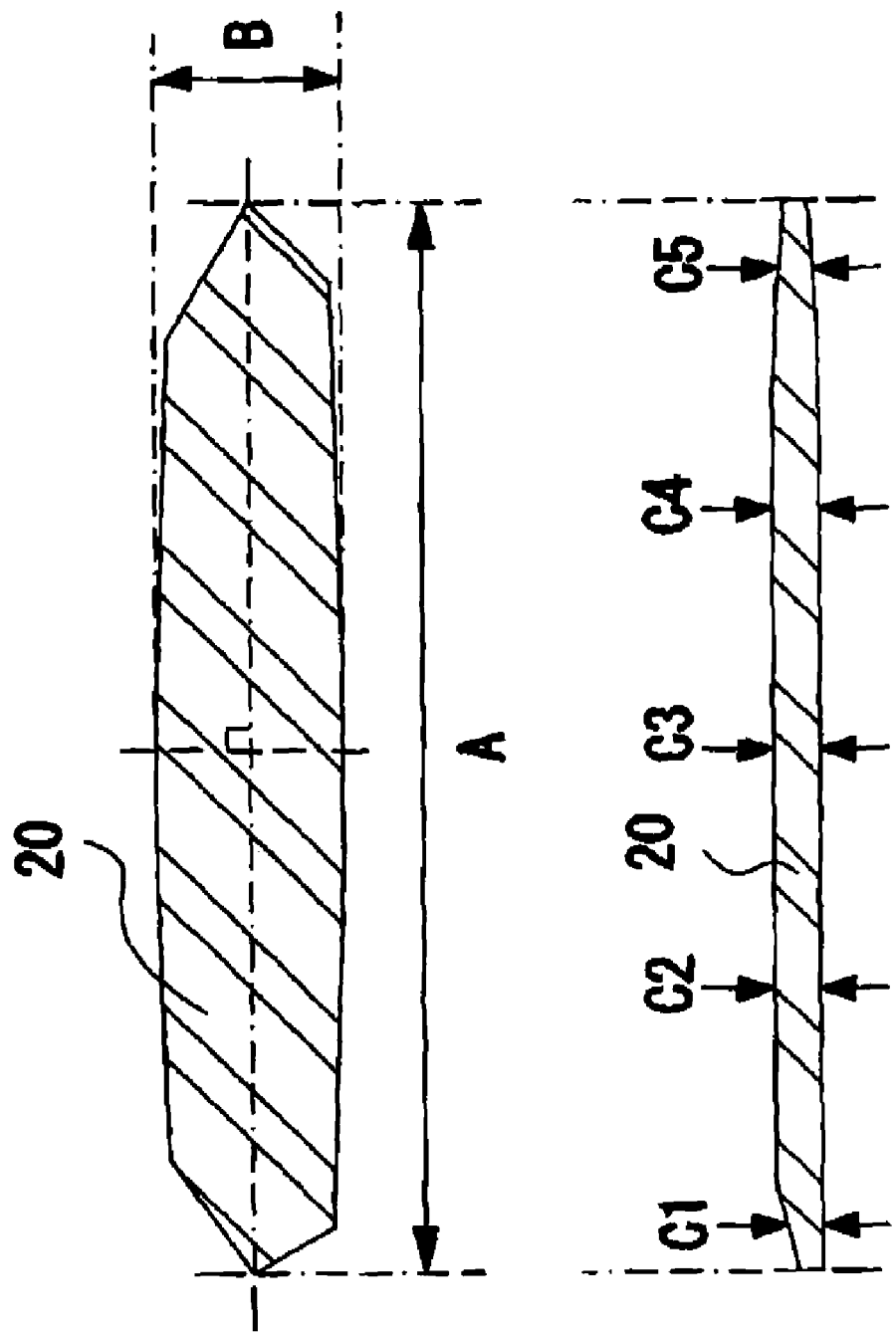

SOLID ELECTROLYTIC CAPACITOR

CROSS REFERENCE TO RELATED APPLICATIONS

This application claims priority based on 35 USC 119 from prior Japanese Patent Application No. P2007-216059 filed on Aug. 22, 2007, the entire contents of which are incorporated herein by reference.

BACKGROUND OF THE INVENTION

1. Field of the Invention

The present invention relates to a solid electrolytic capacitor including an anode formed of a valve metal as well as a dielectric film, a conducting polymer layer, and a cathode extraction layer deposited thereon.

2. Description of Related Art

Solid electrolytic capacitors are used in a manner of being incorporated into power supply circuits of CPU and peripheral circuits thereof in various kinds of mobile information terminals, such as personal computers and mobile phones, various kinds of image information devices, such as digital cameras, and other electronic devices.

In general, in a solid electrolytic capacitor, a dielectric layer is formed on an anode made of a so-called valve metal, such as tantalum, niobium, titanium, or aluminum, and an electrolyte layer and a cathode extraction layer are formed on the dielectric layer. As such electrolyte layer, a metal oxide layer, such as manganese dioxide, or a conducting polymer layer, such as polypyrrole and polythiophene, is used.

In the above-described electronic devices, it is required to lower a resistance component of the solid electrolytic capacitor as low as possible. In recent studies, the ESR (equivalent series resistance) of a solid electrolytic capacitor is further lowered.

Japanese Patent Laid-open Publication No. Hei 7-94368 discloses that graphite powder, conducting polymer compound powder, metal powder, and the like are mixed in a conducting polymer layer so as to cause a surface of the conducting polymer layer to be uneven. When the surface of the conducting polymer layer is formed unevenly, mechanical adhesion between the conducting polymer layer and the cathode extraction layer is improved. Accordingly, the dissipation factor (tangent of loss angle: tan δ), and ESR in a high-frequency region can be reduced.

Japanese Patent Lai-open Publication No. 2002-15956 discloses that in a solid electrolytic capacitor including a first conducting polymer layer and a second conducting polymer layer being laminated, the second conducting polymer layer contains a carbon fiber. The carbon fiber is contained in the conducting polymer layer, so that a specific resistance is reduced and an impedance characteristic and capacitance appearance factor in the high-frequency region is improved.

However, in the solid electrolytic capacitor in which graphite or the like is mixed in the conducting polymer layer and the surface of the conducting polymer layer is formed unevenly, a contact area of an interface between the conducting polymer layer and the cathode extraction layer is increased, but the specific resistance of the conducting polymer layer hardly changes. Thus, ESR cannot be reduced greatly.

In addition, in the solid electrolytic capacitor containing the carbon fiber in the conducting polymer layer, the conducting polymer layer is easily deformed under a high-temperature condition. For this reason, the carbon fiber cannot follow the deformation of the conducting polymer layer. Consequently, there arise problems such as a gap generated between the conducting polymer and the carbon fiber, and damage to the carbon fiber itself. As a result, ESR cannot be sufficiently reduced even if the conducting polymer layer contains the carbon fiber.

SUMMARY OF THE INVENTION

An aspect of the invention provides a solid electrolytic capacitor that comprises: an anode mainly formed of a valve metal; a dielectric layer provided on the anode; a conducting polymer layer provided on the dielectric layer, the conducting polymer layer containing a metal-based conductive filler in at least one of a flake form and a fiber form; and a cathode extraction layer provided on the conducting polymer layer.

In the above-described solid electrolytic capacitor, the conducting polymer layer contains the metal-based conductive filler in at least one of a flake form and a fiber form. Accordingly, the metal-based conductive fillers come in contact with each other in the conducting polymer layer, so that a conductive path can be formed in the conducting polymer layer. Thus, a resistance value of the conducting polymer layer can be reduced.

In addition, the metal-based conductive filler is more easily subjected to plastic deformation compared to a carbon-based conductive filler. Accordingly, the metal-based conductive filler can follow the deformation of the conducting polymer layer under a high-temperature condition and does not cause a gap between the conducting polymer and the metal-based conductive filler or damage to the metal-based conductive filler. Furthermore, the considerable deformation of the conducting polymer layer caused under a high-temperature condition can be suppressed by containment of the metal-based conductive filler. Accordingly, separation is prevented at the interface between the conducting polymer layer and the dielectric layer. Thus, changes of capacitance in storage at a high-temperature can be reduced, and thereby reliability can be increased.

Here, it is preferable that the metal-based conductive filler be contained overall in a thickness direction of the conducting polymer layer. Thereby, the metal-based conductive filler can be dispersed overall in the thickness direction of the conducting polymer layer, so that a resistance value of the conducting polymer layer can be further reduced.

In addition, it is preferable that a content of the metal-based conductive filler in the conducting polymer layer be in a range from 1 weight % to 70 weight %. Setting the content in the above-described range enables the metal-based conductive filler to securely come in contact with each other in the conducting polymer layer. Accordingly, a resistance value of the conducting polymer layer can be further reduced, and thus ESR can be further reduced.

As described above, one embodiment of the invention can provide a solid electrolytic capacitor with low ESR and excellent reliability in high-temperature storage.

BRIEF DESCRIPTION OF THE DRAWING

FIG. 2 is a schematic view showing the image of flake-form metal-based conductive filler 20.

DETAILED DESCRIPTION OF EMBODIMENT

Figure 1:
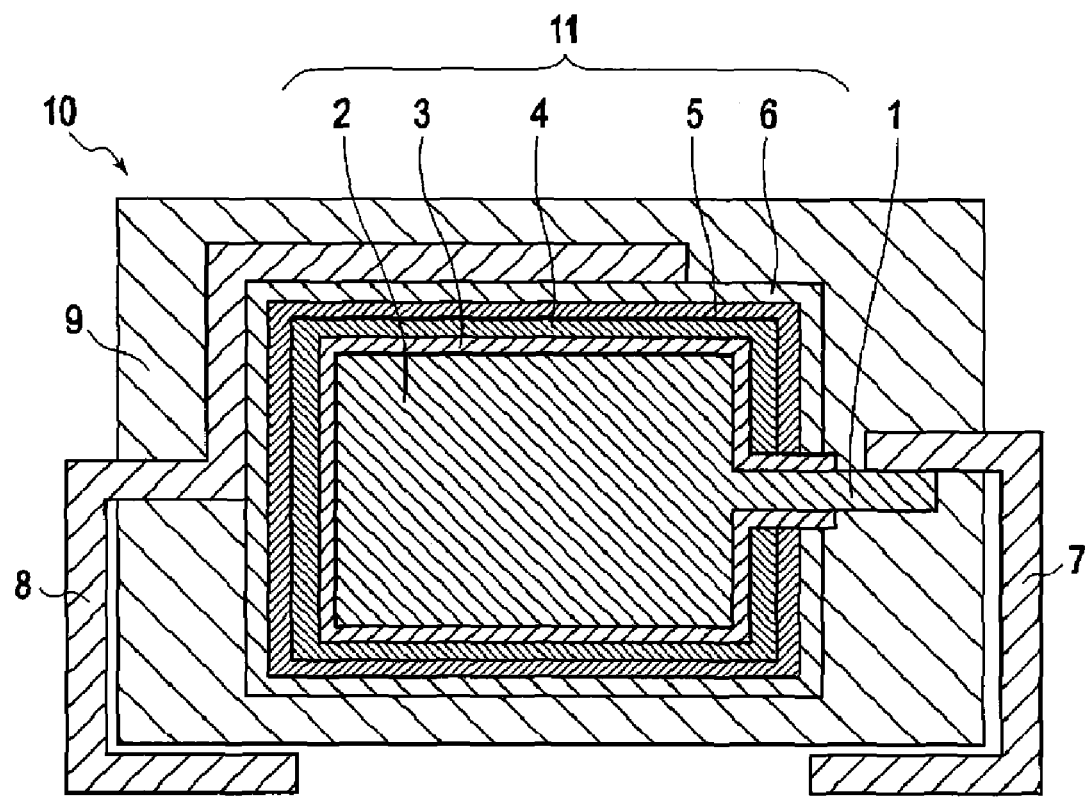
FIG. 1 is a schematic cross-sectional view showing a solid electrolytic capacitor of an embodiment.

An embodiment of the invention will be described below based on the drawing. The drawing is only an example, and the invention is not limited to proportions of sizes and the like in the drawing. Accordingly, specific sizes and the like have to be judged by considering the following description.

Prepositions, such as "on", "over" and "above" may be defined with respect to a surface, for example a layer surface, regardless of that surface's orientation in space. Preposition "above" may be used in the specification and claims even if a layer is in contact with another layer. Preposition "on" may be used in the specification and claims when a layer is not in contact with another layer, for example, when there is an intervening layer between them.

FIG. 1 is a schematic cross-sectional view showing a solid electrolytic capacitor of an embodiment. As shown in FIG. 1, solid electrolytic capacitor 10 according to an embodiment includes capacitor element 11, anode terminal 7, cathode terminal 8, and outer package 9. Capacitor element 11 comprises of dielectric layer 3 formed of a dielectric oxide film, conducting polymer layer 4, conductive carbon layer 5, and silver paste layer 6 deposited on anode 2 in listed order. Anode lead wire 1 is buried in anode 2 of capacitor element 11, and anode terminal 7 is welded to anode lead wire 1. Cathode terminal 8 is connected to silver paste layer 6. Conductive carbon layer 5 and silver paste layer 6 constitute a cathode extraction layer. Capacitor element 11 is covered with outer package 9, such as an epoxy resin and thereby is sealed.

Anode 2 is formed of a valve metal. The valve metal includes, for example, an element of a metal, such as tantalum, niobium, titanium, or aluminum, or an alloy of these metals. The form of anode 2 is not particularly limited and includes a porous sintered body, a foil-form substrate, and the like. The embodiment adopts a porous sintered body manufactured by sintering tantalum powder under conditions with a reduced pressure and high-temperature after pressing and molding the tantalum powder into an anode shape. Such a porous sintered body has a large specific surface area, and thus can achieve an increase in capacity.

Dielectric layer 3 is not particularly limited. For example, dielectric layer 3 can be formed by anodizing a surface of anode 2 in a solution of phosphoric acid or the like. In the embodiment, the tantalum porous sintered body is used as anode 2 and the tantalum oxide layer is formed as dielectric layer 3.

Conducting polymer layer 4 is used as a solid electrolyte layer, and is not particularly limited as long as it is formed of a conducting polymer. For example, poly (3,4-ethylenedioxythiophene), polypyrrole, polythiophene, polyaniline, and the like have a particularly high electrical conductivity. Thus, one kind or multiple kinds of these conducting polymers can be used. Conducting polymer layer 4 may be a single layer or multiple layers. If conducting polymer layer 4 is formed as multiple layers, conducting polymers in each layer may be formed of the same material or different kinds of materials. In the embodiment, conducting polymer layer 4 is formed as a single layer using polypyrrole.

Conducting polymer layer 4 contains a metal-based conductive filler in at least one of a flake form and a fiber form. The flake-form or fiber-form metal-based conductive filler is contained, so that the metal-based conductive fillers can be brought into contact with each other to form a conductive path in conducting polymer layer 4. Accordingly, the resistance value of conducting polymer layer 4 can be reduced.

When the flake-form metal-based conductive filler is used, it is preferable that a mean flake diameter be in a range from 0.1 μm to 100 μm, and, more preferably, in a range from 1 μm to 50 μm. It is also preferable that a mean aspect ratio (mean flake diameter/mean thickness) be in a range from 5 to 1000, and, more preferably, in a range from 10 to 500. Use of such flake-form metal-based conductive filler enables the metal-based conductive fillers to easily come in contact with each other. Thereby, the conductivity of conducting polymer layer 4 can be improved.

The mean filler diameter may be determined by the following method: First, extract around 100 to 1000 flake-shaped fillers (also termed "flakes") randomly. Measure major and minor axis diameters of each extracted filler using the below method. Calculate average filler diameter α that is the average of the major and the minor axis diameters for each flake, which is expressed by α=((major axis diameter+minor axis diameter)/2). Finally calculate mean filler diameter by dividing the total of the average filler diameter α by the number of measured fillers.

The major axis diameter may be a maximum value of a filler. The minor axis diameter may be a diameter that is substantially vertical direction of the major axis diameter. The minor axis diameter may be a maximum value in a diameter that is substantially vertical direction of the major axis diameter.

For example, when the flake-shaped metal-based conductive filler is in the shape of oval foil, the average filler diameter α is the average of the major axis diameter and the minor axis diameter of the oval foil.

Mean thickness may be determined by the following method: measure thickness of, for example, about three to ten points of each filler that are chosen along the major axis diameter. Calculate the average filler thickness β of a filler based on the thickness of measured points. The measured points are preferably chosen in the same interval along the major axis direction. Finally calculate the mean filler diameter by dividing the total of the average filler thickness β by the number of measured fillers.

FIG. 2A is a schematic view showing the image of flake-shaped metal-based conductive filler 20 observed from the top via a microscope such as a SEM (Scanning Electron Microscope).

The Mean diameter of flake-shaped filler may be determined by following method: Measure the major and minor axis diameters by observing flake-shape filler 20 from the top. Then calculate average filler diameter based on measured major axis diameter A and minor axis diameter B measured. The average filler diameter α is calculated by the average of the major axis diameter A and the minor axis diameter B, which is expressed by (α=(A+B)/2). Finally calculate the mean filler diameter based on the total of the calculated average filler diameters α from about 100 to 1000 flake-shaped fillers.

FIG. 2B is a schematic view showing the image of flake-shape metal-based conductive filler 20 observed from the side via a microscope such as a SEM.

The mean thickness of flake-shaped filler may be determined by following method: Measure thickness of each filler at the plurality of points (for example five points; C1, C2, . . . , C5) of by observing flake-shaped filler 20 from the side via a microscopy such as a SEM. The points are chosen along the major axis and the points preferably are chosen in the same interval. Calculate the average filler thickness β by dividing the total of the measured thickness by the number of the measurement point, which is expressed by (β=(C1+C2+C3+C4+C5)/5). Finally calculate mean filler thickness by totaling the average filler thickness β for each flake and dividing by number of flakes using about 100 to 1000 flakes-shaped fillers.

When the fiber-form metal-based conductive filler is used, from the same view point as described above, it is preferable that a mean fiber diameter be in a range from 0.1 μm to 5 μm, and, more preferably, in a range from 0.5 μm to 1 μm. The mean fiber length is preferably in a range from 10 μm to 100 μm, and, more preferably, in a range from 15 μm to 50 μm.

As described above, it is preferable that the metal-based conductive filler be contained so as to be dispersed overall in a thickness direction orientation within conducting polymer layer 4. Thereby, a conductive path can be formed between conductive carbon layer 5 and an interface between dielectric film 3 and conducting polymer layer 4. Thus, the ESR of solid electrolytic capacitor 10 can be greatly reduced. When conducting polymer layer 4 is formed of multiple layers, it is preferable that the metal-based conductive filler be contained in the multiple layers. However, it is also possible that only any one of the multiple layers contains the metal-based conductive filler.

The content of the metal-based conductive filler in conducting polymer layer 4 is preferably in a range from 1 weight % to 70 weight %. When the content of the metal-based conductive filler in conducting polymer layer 4 is excessively reduced, mutual contact of the metal-based conductive fillers does not occur easily. Accordingly, effects of improving conductivity are reduced. In contrast, when the content of the metal-based conductive filler is excessively increased, this is disadvantageous in a cost viewpoint. Moreover, this leads to shortage of an amount of conducting polymer, which is required to bring the metal-based conductive fillers into contact with each other. Thus, the effects of improving conductivity are limited. More preferably, the content of the metal-based conductive filler is in a range from 5 weight % to 50 weight %, and most preferably, in a range from 10 weight % to 30 weight %.

In the examples, conducting polymer layer 4 contains a metal-based conductive filler in at least one of a flake form and a fiber form. In the examples, in addition to the metal-based conductive filler in such a form, a metal-based conductive filler in another form may be contained. For example, a particle-form conductive filler with a mean particle diameter of 1 nm to 100 nm may be contained. Due to containment of such particle-form conductive filler, the particle-form conductive filler goes into a gap between the flake-form or fiber-form metal-based conductive fillers in conducting polymer layer 4 so that a conductive path is formed. Accordingly, the conductivity of conducting polymer layer 4 can be further improved.

The metal-based conductive filler in the example only needs a metal-based material. For example, the metal-based conductive filler may be formed of a simple substance of a metal, alloy, oxide, one having a plated surface, or the like. The metal-based conductive filler is more easily subjected to plastic deformation than a carbon-based conductive filler. Accordingly, it can follow the deformation of conducting polymer layer 4 under a high-temperature condition and does not cause a gap due to separation between the conducting polymer and the metal-based conductive filler, and damage to the metal-based conductive filler can be prevented. In addition, the considerable deformation of conducting polymer layer 4 under a high-temperature condition can be prevented, so that separation is prevented at the interface between conducting polymer layer 4 and dielectric layer 3.

As such metal-based conductive filler, as described above, for example, one containing at least one of metals, such as gold, silver, nickel, copper, zinc, aluminum, and iron, as a simple substance or an alloy can be used. These metals have excellent conductivity and are preferably used. As such alloy, for example, a silver-copper alloy, silver-platinum alloy, silver-palladium alloy, stainless, and the like are included. Of the above-described metals, gold, silver, copper and aluminum have conductivity and are relatively soft, and thus can easily follow the deformation of conducting polymer layer 4. Accordingly, they are particularly preferred. In addition, in consideration of cost, silver, copper, and aluminum are more preferably used.

In addition, as the metal-based conductive filler used in the example, a metal or resin coated with another metal can be used. In this case, a metal with a high conductivity is used for the outer metal and a relatively soft material is used for the inner metal or resin. Thereby, the metal-based conductive filler can follow the deformation of conducting polymer layer 4 while maintaining high conductivity.

A method for manufacturing the metal-based conductive filler according to the example is not particularly limited. For example, in an embodiment, a material metal is powdered by an atomizing method or the like, and thereafter is mechanically ground and flaked by a ball mill or the like. In another method, a molten metal is directly processed into a flake form or a fiber form. Moreover, if the metal or resin covered with another metal is used, for example, an evaporation method or a plating method is used for metal coating on the metal or resin which is processed in a flake form or a fiber form in advance.

In addition, conducting polymer layer 4 can be formed by depositing and depolymerizing the solution on dielectric layer 3. The solution is obtained by mixing a monomer to a material of conducting polymer with the metal-based conductive filler at a predetermined ratio.

Conductive carbon layer 5 and silver paste layer 6 are not particularly limited, and may be formed respectively by applying a paste containing conductive carbon and a paste containing silver particles.

EXAMPLE

A solid electrolytic capacitor according to the invention will be described below by specific examples. However, the invention is not limited to the following examples.

Preliminary Experiment

A chemical polymerization solution is prepared by dissolving 10 weight % of pyrrole as a polymerizable monomer and 16 weight % of para-toluene sulfonic acid iron (III) as a dopant/oxidizing agent in a mixed solvent of ethanol and water with a volume ratio of 5 to 1. Then, 7.5 weight % of a flake-form silver filler, as a metal-based conductive filler, with a mean flake diameter of 10 μm and a mean aspect ratio of 50 is uniformly mixed in this chemical polymerization solution. Thereafter, a glass substrate is soaked in and taken out from the chemical polymerization solution. This glass substrate is left in the atmosphere for two hours. Thereby, a conducting polymer film with a thickness of approximately 100 μm is formed on the glass substrate.

After that, the conducting polymer film formed on the glass substrate is removed, and a specific amount thereof is correctly weighed. Thereafter, it is put in a Teflon (a registered trademark) airtight container, together with a small amount of concentrated nitric acid. Then, a silver filler contained in the conducting polymer film is heated and dissolved by using a microwave wet degradation device. Subsequently, a liquid resulting from the dissolving is diluted in water of predetermined amount to quantify an element by using an ICP emission spectrophotometer. Consequently, the conducting polymer film contains 15 weight % of the silver filler.

Experiment 1

Example 1

A tantalum powder with a mean particle diameter of approximately 2 μm is formed in a substantially plate-shape on anode lead wire 1 formed of tantalum so as to cover one portion of anode lead wire 1, and then is sintered in vacuum to form anode 2. Subsequently, anode 2 is anodized at a specific voltage of approximately 8 V for 10 hours in a phosphoric acid solution with a concentration of approximately 0.1 weight % and at a temperature being kept at approximately 60° C. Thereby, dielectric layer 3 formed of tantalum oxide is formed so as to surround the circumference of anode 2.

Next, a chemical polymerization solution is prepared by dissolving 10 weight % of pyrrole as a polymerizable monomer and 16 weight % of para-toluene sulfonic acid iron (III) as a dopant/oxidizing agent in a mixed solvent of ethanol and water with a volume ratio of 5 to 1. Then, 5 weight % of a flake-form silver filler, as a metal-based conductive filler, with a mean flake diameter of 10 μm and a mean aspect ratio of 50 is uniformly mixed in this chemical polymerization solution. An element with dielectric layer 3 formed thereon is soaked in this chemical polymerization solution, and is left in the atmosphere for two hours. Thereby, conducting polymer layer 4 is formed on dielectric layer 3. Conducting polymer layer 4 contains 15 weight % of silver filler and the thickness thereof is 100 μm. Moreover, a conductive carbon paste is applied onto conducting polymer layer 4 and is dried at 150° C. for 30 minutes. Thereby, conductive carbon layer 5 is formed. Subsequently, a silver paste is applied onto conductive carbon layer 5 and dried at 170° C. for 30 minutes to form silver paste layer 6. Thereby, capacitor element 11 is manufactured.

Thereafter, anode terminal 7 is connected to anode lead wire 1 and cathode terminal 8 is connected to silver paste layer 6, so that end portions of anode terminal 7 and cathode terminal 8 would be taken outside. Thereby, capacitor element 11 is covered with outer package 9 to manufacture solid electrolytic capacitor 10.

Example 2

As a metal-based conductive filler, a solid electrolytic capacitor is manufactured in a similar manner as that of example 1, except that a fiber-form copper filler with a mean fiber diameter of 0.5 μm and a mean fiber length of 30 μm is used.

Comparative Example 1

A solid electrolytic capacitor is manufactured in a similar manner to that of example 1, except that a conductive filler is not contained in a conducting polymer layer.

Comparative Example 2

A solid electrolytic capacitor is manufactured in a similar manner as that of example 1, except that a carbon particle with a mean particle diameter of approximately 1 μm is used as a conductive filler.

Comparative Example 3

A solid electrolytic capacitor is manufactured in a similar manner as that of example 1, except that a carbon fiber with a mean fiber diameter of 0.5 μm and a mean fiber length of 30 μm is used as a conductive filler.

[ESR Measurement]

With regard to the solid electrolytic capacitors manufactured in examples 1 and 2 and comparative examples 1 to 3, ESR values at a frequency of 100 kHz are measured. The ESR measurement is carried out by applying a voltage to a portion between anode terminal 7 and cathode terminal 8 by using an LCR meter. Table 1 shows the results. Note that ESR values are values standardized by using the measurement result of comparative example 1 as 100.

TABLE 1

|  | ESR |
|---|---|
| Example 1 | 67 |
| Example 2 | 68 |
| Comparative example 1 | 100 |
| Comparative example 2 | 97 |
| Comparative example 3 | 69 |

As shown in Table 1, ESR values of the solid electrolytic capacitors of examples 1 and 2 are smaller than those of the solid electrolytic capacitors of comparative examples 1 and 2. This is possibly because, in examples 1 and 2, a flake-form or fiber-form metal-based conductive filler is contained, so that the metal-based conductive fillers come in contact with each other to form a conductive path in conducting polymer layer 4 and the resistance value of conducting polymer layer 4 can be reduced. In comparative example 3 using a carbon fiber, similar to examples 1 and 2, it can be seen that ESR is reduced.

[Evaluation by Preservation Test]

A preservation test is carried out on the solid electrolytic capacitors manufactured in examples 1 and 2 and comparative examples 1 to 3. The preservation test is carried out at 125° C., with the applied voltage of 1.5 V for 2000 hours, and capacitances at the frequency of 120 Hz are measured before and after the preservation test. Table 2 shows the capacitance ratio before and after the preservation test (capacitance after the preservation test/capacitance before the preservation test).

TABLE 2

|  | Capacitance ratio before and after preservation test(%) |
|---|---|
| Example 1 | 89 |
| Example 2 | 91 |
| Comparative example 1 | 68 |
| Comparative example 2 | 67 |
| Comparative example 3 | 70 |

As shown in Table 2, larger capacitance ratios before and after the preservation test are shown in the solid electrolytic capacitors of examples 1 and 2, compared to the capacitance ratio of the solid electrolytic capacitor of any one of comparative examples 1 to 3. This is possibly because, in examples 1 and 2, the metal-based conductive filler can suppress large deformation of conducting polymer layer 4 under a high-temperature condition, and thus a separation does not occur at an interface between dielectric layer 3 and conducting polymer layer 4, whereas in comparative examples 1 to 3, separation occurs at the interface. In particular, in comparative example 3 using the carbon fiber, there is an effect of lowering ESR values to some extent as shown in Table 1. However, the capacitance ratios before and after the preservation test are lowered. Thus, it shows lower reliability in high-temperature storage.

Experiment 2

Example 3

A solid electrolytic capacitor is manufactured in a similar manner as that of example 1, except that 0.25 weight % of a silver filler similar to that of example 1 is mixed in the chemical polymerization solution in example 1 to form conducting polymer layer 4 containing 0.5 weight % of the silver filler.

Example 4

A solid electrolytic capacitor is manufactured in a similar manner as that of example 1, except that 0.5 weight % of a silver filler similar to that of example 1 is mixed in the chemical polymerization solution in example 1 to form conducting polymer layer 4 containing 1 weight % of the silver filler.

Example 5

A solid electrolytic capacitor is manufactured in a similar manner as that of example 1, except that 2.5 weight % of a silver filler similar to that of example 1 is mixed in the chemical polymerization solution in example 1 to form conducting polymer layer 4 containing 5 weight % of the silver filler.

Example 6

A solid electrolytic capacitor is manufactured in a similar manner as that of example 1, except that 5 weight % of a silver filler similar to that of example 1 is mixed in the chemical polymerization solution in example 1 to form conducting polymer layer 4 containing 10 weight % of the silver filler.

Example 7

A solid electrolytic capacitor is manufactured in a similar manner as that of example 1, except that 10 weight % of a silver filler similar to that of example 1 is mixed in the chemical polymerization solution in example 1 to form conducting polymer layer 4 containing 20 weight % of the silver filler.

Example 8

A solid electrolytic capacitor is manufactured in a similar manner as that of example 1, except that 15 weight % of a silver filler similar to that of example 1 is mixed in the chemical polymerization solution in example 1 to form conducting polymer layer 4 containing 30 weight % of the silver filler.

Example 9

A solid electrolytic capacitor is manufactured in a similar manner as that of example 1, except that 20 weight % of a silver filler similar to that of example 1 is mixed in the chemical polymerization solution in example 1 to form conducting polymer layer 4 containing the 40 weight % of silver filler.

Example 10

A solid electrolytic capacitor is manufactured in a similar manner as that of example 1, except that 25 weight % of a silver filler similar to that of example 1 is mixed in the chemical polymerization solution in example 1 to form conducting polymer layer 4 containing 50 weight % of the silver filler.

Example 11

A solid electrolytic capacitor is manufactured in a similar manner as that of example 1, except that 30 weight % of a silver filler similar to that of example 1 is mixed in the chemical polymerization solution in example 1 to form conducting polymer layer 4 containing 60 weight % of the silver filler.

Example 12

A solid electrolytic capacitor is manufactured in a similar manner as that of example 1, except that 35 weight % of a silver filler similar to that of example 1 is mixed in the chemical polymerization solution in example 1 to form conducting polymer layer 4 containing 70 weight % of the silver filler.

Example 13

A solid electrolytic capacitor is manufactured in a similar manner as that of example 1, except that 37.5 weight % of a silver filler similar to that of example 1 is mixed in the chemical polymerization solution in example 1 to form conducting polymer layer 4 containing 75 weight % of the silver filler.

Example 14

A solid electrolytic capacitor is manufactured in a similar manner as that of example 1, except that 40 weight % of a silver filler similar to that of example 1 is mixed in the chemical polymerization solution in example 1 to form conducting polymer layer 4 containing 80 weight % of the silver filler.

[ESR Measurement and Preservation Test]

Similar to the above-described experiment, ESR values of the solid electrolytic capacitors manufactured in examples 3 to 14 are measured, and a preservation test is carried out. The ESR values and capacitance ratios before and after the preservation test are shown in Table 3. Note that Table 3 shows values of example 1 and comparative example 1 together. The ESR values shown in Table 3 are values standardized by using the measurement result of comparative example 1 as 100.

TABLE 3

| | Content of silver filler in conducting polymer layer (wt %) | ESR | ESR capacitance ratios before and after preservation test (%) |
|---|---|---|---|
| Comparative example 1 | 0 | 100 | 68 |
| Example 3 | 0.5 | 88 | 82 |
| Example 4 | 1 | 79 | 83 |
| Example 5 | 5 | 74 | 85 |
| Example 6 | 10 | 68 | 87 |
| Example 1 | 15 | 67 | 89 |
| Example 7 | 20 | 68 | 88 |
| Example 8 | 30 | 69 | 89 |
| Example 9 | 40 | 72 | 87 |
| Example 10 | 50 | 73 | 86 |
| Example 11 | 60 | 75 | 86 |
| Example 12 | 70 | 78 | 85 |
| Example 13 | 75 | 88 | 84 |
| Example 14 | 80 | 89 | 83 |

As shown in Table 3, all of the solid electrolytic capacitors of examples 1 and 3 to 14 show lower ESR values than that of the solid electrolytic capacitor of comparative example 1. In addition, capacitance ratios before and after the preservation test are larger. In particular, if the content of the metal-based conductive filler in the conducting polymer layer is in a range from 1 weight % to 70 weight %, ESR values are lower and the capacitance ratios before and after the preservation test are higher. It can be seen from the results shown in Table 3 that the content of the metal-based conductive filler is preferably 5 weight % to 50 weight %, and more preferably 10 weight % to 30 weight %.

Experiment 3

Example 15

A solid electrolytic capacitor is manufactured in a similar manner as that of example 1, except that a flake-form gold filler with a mean flake diameter of 10 μm and a mean aspect ratio of 50 is used as a metal-based conductive filler.

Example 16

A solid electrolytic capacitor is manufactured in a similar manner as that of example 1, except that a flake-form nickel filler with a mean flake diameter of 10 μm and a mean aspect ratio of 50 is used as a metal-based conductive filler.

Example 17

A solid electrolytic capacitor is manufactured in a similar manner as that of example 1, except that a flake-form copper filler with a mean flake diameter of 10 μm and a mean aspect ratio of 50 is used as a metal-based conductive filler.

Example 18

A solid electrolytic capacitor is manufactured in a similar manner as that of example 1, except that a flake-form zinc filler with a mean flake diameter of 10 μm and a mean aspect ratio of 50 is used as a metal-based conductive filler.

Example 19

A solid electrolytic capacitor is manufactured in a similar manner as that of example 1, except that a flake-form aluminum filler with a mean flake diameter of 10 μm and a mean aspect ratio of 50 is used as a metal-based conductive filler.

Example 20

A solid electrolytic capacitor is manufactured in a similar manner as that of example 1, except that a flake-form iron filler with a mean flake diameter of 10 μm and a mean aspect ratio of 50 is used as a metal-based conductive filler.

[ESR Measurement and Preservation Test]

Similar to the above-described experiment 1, ERS values of the solid electrolytic capacitors manufactured in examples 15 to 20 are measured and a preservation test is carried out. Table 4 shows ESR values and capacitance ratios before and after the preservation test. Table 4 shows ESR values of example 1 and comparative example 1 and capacitance ratios before and after the preservation test together. Note that ESR values are values standardized by using the measurement result of comparative example 1 as 100.

TABLE 5

| | Kind of metal-based conductive filler | ESR | Capacitance ratio before and after preservation test(%) |
|---|---|---|---|
| Example 15 | gold | 68 | 87 |
| Example 1 | silver | 67 | 89 |
| Example 16 | nickel | 72 | 84 |
| Example 17 | copper | 68 | 85 |
| Example 18 | zinc | 71 | 88 |
| Example 19 | aluminum | 69 | 87 |
| Example 20 | iron | 72 | 84 |
| Comparative example 1 | — | 100 | 68 |

As is clear from the results shown in Table 4, all of the solid electrolytic capacitors of examples 1 and 15 to 20 have lower ESR values and higher capacitance ratios before and after the preservation test, than those of the solid electrolytic capacitor of comparative example 1. This can show that gold, silver, nickel, copper, zinc, aluminum, and iron are preferable as the metal-based conductive filler. This is possibly because these metals used as the metal-based conductive filler have a particularly high conductivity and are relatively soft, and thus easily follow the deformation of the conducting polymer layer.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:
1. A solid electrolytic capacitor comprising:
an anode formed substantially by a valve metal;
a dielectric layer provided on the anode;
a conducting polymer layer provided on the dielectric layer, the conducting polymer layer comprising a conducting polymer and a metal-based conductive filler in at least one of a flake form and a fiber form; and
a cathode extraction layer provided on the conducting polymer layer.
2. The solid electrolytic capacitor of claim 1, wherein
the conducting polymer layer comprises a flake-form metal-based conductive filler, and
the flake-form metal-based conductive filler has a mean flake diameter between 0.1 μm and 100 μm inclusive.
3. The solid electrolytic capacitor of claim 1, wherein
the conducting polymer layer comprises a flake-form metal-based conductive filler, and
the flake-form metal-based conductive filler has a mean flake diameter between 1 μm and 50 μm inclusive.
4. The solid electrolytic capacitor of claim 1, wherein
the conducting polymer layer comprises a flake-form metal-based conductive filler, and
the flake-form metal-based conductive filler has a mean aspect ratio of between 5 and 1000 inclusive.
5. The solid electrolytic capacitor of claim 1, wherein
the conducting polymer layer comprises a fiber-form metal-based conductive filler, and
the fiber-form metal-based conductive filler has a mean fiber diameter of between 0.1 μm and 5 μm inclusive.

6. The solid electrolytic capacitor of claim 1, wherein
the conducting polymer layer comprises a fiber-form metal-based conductive filler, and
the fiber-form metal-based conductive filler has a mean fiber diameter of between 0.5 μm and 1 μm inclusive.

7. The solid electrolytic capacitor of claim 1, wherein
the conducting polymer layer comprises a fiber-form metal-based conductive filler, and
the fiber-form metal-based conductive filler has a mean fiber length of between 10 μm and 100 μm inclusive.

8. The solid electrolytic capacitor of claim 1, wherein
the conducting polymer layer comprises a fiber-form metal-based conductive filler, and
the fiber-form metal-based conductive filler has a mean fiber length of between 15 μm and 50 μm inclusive.

9. The solid electrolytic capacitor of claim 1, wherein
the metal-based conductive filler is contained overall in a thickness direction of the conducting polymer layer.

10. The solid electrolytic capacitor of claim 1, wherein
the conducting polymer layer has multiple layers, and
at least one of the layers comprises the metal-based conductive filler.

11. The solid electrolytic capacitor of claim 1, wherein
the conducting polymer layer has multiple layers, and
all of the layers comprise the metal-based conductive filler.

12. The solid electrolytic capacitor of claim 1, wherein
the conducting polymer layer comprises between 1 weight % and 70 weight % inclusive metal-based conductive filler.

13. The solid electrolytic capacitor of claim 1, wherein
the conducting polymer layer comprises between 5 weight % and 50 weight % inclusive metal-based conductive filler.

14. The solid electrolytic capacitor of claim 1, wherein
the conducting polymer layer comprises between 10 weight % and 30 weight % inclusive metal-based conductive filler.

15. The solid electrolytic capacitor of claim 1, wherein
the conducting polymer layer comprises a particle-form conductive filler, and
the particle-form conductive filler has a mean particle diameter of between 1 nm and 100 nm inclusive.

16. The solid electrolytic capacitor of claim 1, wherein
the metal-based conductive filler is formed of at least one metal selected from the group consisting of gold, silver, nickel, copper, zinc, aluminum, and iron.

17. The solid electrolytic capacitor of claim 1, wherein
the metal-based conductive filler including: at least one of a first metal and a resin;
and a second metal, the second metal covering the at least one of the first metal and the resin.

18. The solid electrolytic capacitor of claim 17, wherein
the second metal has a higher conductivity than the at least one of the first metal and the resin in the metal-based conductive filler.

19. The solid electrolytic capacitor of claim 17, wherein
the at least one of the first metal and the resin is a softer material than the second metal in the metal-based conductive filler.

20. The solid electrolytic capacitor of claim 1, wherein the conducting polymer layer exists as a continuous cross-linked single layer of the conducting polymer.

* * * * *